United States Patent
Inaida (10) Patent No.: US 8,036,171 B2
(45) Date of Patent: Oct. 11, 2011

(54) MULTICARRIER COMMUNICATION BASE STATION DEVICE AND SUBCARRIER ALLOCATION METHOD

(75) Inventor: Yusuke Inaida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/812,137

(22) PCT Filed: Jan. 19, 2009

(86) PCT No.: PCT/JP2009/050647
§ 371 (c)(1),
(2), (4) Date: Jul. 8, 2010

(87) PCT Pub. No.: WO2009/101838
PCT Pub. Date: Aug. 20, 2009

(65) Prior Publication Data
US 2010/0278135 A1 Nov. 4, 2010

(30) Foreign Application Priority Data
Feb. 12, 2008 (JP) ................... 2008-030824

(51) Int. Cl.
*H04W 4/00* (2009.01)
*H04W 72/00* (2009.01)
*H04B 7/208* (2006.01)
*H04L 12/28* (2006.01)
*H04J 3/16* (2006.01)

(52) U.S. Cl. ............... 370/329; 370/344; 370/395.21; 370/437; 455/452.2

(58) Field of Classification Search .............. None
See application file for complete search history.

(56) References Cited

U.S. PATENT DOCUMENTS

| 6,947,748 | B2 * | 9/2005 | Li et al. | 455/450 |
|---|---|---|---|---|
| 7,313,407 | B2 * | 12/2007 | Shapira | 455/512 |
| 7,680,199 | B2 * | 3/2010 | Armour et al. | 375/260 |
| 2006/0198338 | A1 * | 9/2006 | Ishii et al. | 370/329 |

FOREIGN PATENT DOCUMENTS

JP  2005102225 A  4/2005

OTHER PUBLICATIONS

International Search Report for PCT/JP2009/050647 mailed Mar. 10, 2009.

* cited by examiner

*Primary Examiner* — Daniel J Ryman
*Assistant Examiner* — Cassandra Decker (57) ABSTRACT

A multicarrier communication base station device (1) in accordance with the present invention includes selection unit that selects a subcarrier to be allocated based on transmission rate information in each mobile station (2), evaluation value calculation unit that calculates a reference value of a transmission rate with regard to a subcarrier to be allocated based on transmission rate information in each mobile station (2) and then calculate an evaluation value that is obtained by evaluating a difference between the reference value and a transmission rate of a subcarrier excluded from allocation, and priority determination unit that determines a priority of a mobile station to be assigned to each subcarrier based on an evaluation value calculated by the evaluation value calculation unit.

16 Claims, 9 Drawing Sheets

| | SUBCARRIER 1 | SUBCARRIER 2 | SUBCARRIER 3 | SUBCARRIER 4 | SUBCARRIER 5 | REQUESTED TRANSMISSION RATE |
|---|---|---|---|---|---|---|
| MOBILE STATION 1 | 1 | 1 | 1.5 | 3 | 1.5 | 3 |
| MOBILE STATION 2 | 2 | 1.5 | 1.5 | 2 | 2 | 2 |
| MOBILE STATION 3 | 1 | 2 | 3 | 3 | 1.5 | 6 |

Fig. 5

| | SUBCARRIER 1 | SUBCARRIER 2 | SUBCARRIER 3 | SUBCARRIER 4 | SUBCARRIER 5 | REQUESTED TRANSMISSION RATE |
|---|---|---|---|---|---|---|
| MOBILE STATION 1 | 1 | 1 | 1.5 | 3 | 1.5 | 3 |
| MOBILE STATION 2 | 2 | 1.5 | 1.5 | 2 | 2 | 2 |
| MOBILE STATION 3 | 1 | 2 | 3 | 3 | 1.5 | 6 |

Fig. 6

| | SUBCARRIER 1 | SUBCARRIER 2 | SUBCARRIER 3 | SUBCARRIER 4 | SUBCARRIER 5 | Rv | REQUESTED TRANSMISSION RATE |
|---|---|---|---|---|---|---|---|
| MOBILE STATION 1 | 1 | 1 | 1.5 | 3 | 1.5 | 3.13 | 3 |
| MOBILE STATION 2 | 2 | 1.5 | 1.5 | 2 | 2 | 0.25 | 2 |
| MOBILE STATION 3 | 1 | 2 | 3 | 3 | 1.5 | 2.42 | 6 |

Fig. 7

| | SUBCARRIER 1 | SUBCARRIER 2 | SUBCARRIER 3 | SUBCARRIER 4 | SUBCARRIER 5 | Rv | REQUESTED TRANSMISSION RATE |
|---|---|---|---|---|---|---|---|
| MOBILE STATION 1 | ALLOCATION IS FINISHED | 1 | 1.5 | 3 | 1.5 | 3.13 | 3 |
| MOBILE STATION 2 | ALLOCATION IS FINISHED | 1.5 | 1.5 | 2 | 2 | 0.25 | 0 |
| MOBILE STATION 3 | ALLOCATION IS FINISHED | 2 | 3 | 3 | 1.5 | 2.42 | 6 |

Fig. 8

| | SUBCARRIER 1 | SUBCARRIER 2 | SUBCARRIER 3 | SUBCARRIER 4 | SUBCARRIER 5 | Rv | REQUESTED TRANSMISSION RATE |
|---|---|---|---|---|---|---|---|
| MOBILE STATION 1 | ALLOCATION IS FINISHED | 1 | 1.5 | 3 | 1.5 | 3.13 | 3 |
| MOBILE STATION 2 | ALLOCATION IS FINISHED | ALLOCATION IS FINISHED | ALLOCATION IS FINISHED | ALLOCATION IS FINISHED | 2 | 0.25 | 0 |
| MOBILE STATION 3 | ALLOCATION IS FINISHED | 2 | 3 | 3 | 1.5 | 2.42 | 6 |

Fig. 9

| | SUBCARRIER 1 | SUBCARRIER 2 | SUBCARRIER 3 | SUBCARRIER 4 | SUBCARRIER 5 | Rv | REQUESTED TRANSMISSION RATE |
|---|---|---|---|---|---|---|---|
| MOBILE STATION 1 | ALLOCATION IS FINISHED | ALLOCATION IS FINISHED | ALLOCATION IS FINISHED | ALLOCATION IS FINISHED | ALLOCATION IS FINISHED | 3.13 | 0 |
| MOBILE STATION 2 | ALLOCATION IS FINISHED | ALLOCATION IS FINISHED | ALLOCATION IS FINISHED | ALLOCATION IS FINISHED | ALLOCATION IS FINISHED | 0.25 | 0 |
| MOBILE STATION 3 | ALLOCATION IS FINISHED | 2 | ALLOCATION IS FINISHED | ALLOCATION IS FINISHED | 1.5 | 2.42 | 6 |

Fig. 10

| | SUBCARRIER 1 | SUBCARRIER 2 | SUBCARRIER 3 | SUBCARRIER 4 | SUBCARRIER 5 | REQUESTED TRANSMISSION RATE | TOTAL TRANSMISSION RATE |
|---|---|---|---|---|---|---|---|
| MOBILE STATION 1 | 0 | 0 | 0 | 3 | 0 | 3 | 3 |
| MOBILE STATION 2 | 2 | 0 | 0 | 0 | 0 | 2 | 2 |
| MOBILE STATION 3 | 0 | 2 | 3 | 0 | 1.5 | 6 | 6.5 |

| MODULATION MODE | ENCODING RATE | TRANSMISSION RATE |
|---|---|---|
| QPSK | 1/2 | 1 |
| QPSK | 3/4 | 1.5 |
| 16QAM | 1/2 | 2 |
| 16QAM | 3/4 | 3 |

| | SUBCARRIER 1 | SUBCARRIER 2 | SUBCARRIER 3 | SUBCARRIER 4 | SUBCARRIER 5 | DISPERSION | TOTAL TRANSMISSION RATE |
|---|---|---|---|---|---|---|---|
| MOBILE STATION 1 | 1 | 1 | 1.5 | 3 | 1.5 | 0.54 | 3 |
| MOBILE STATION 2 | 2 | 1.5 | 1.5 | 2 | 2 | 0.06 | 2 |
| MOBILE STATION 3 | 1 | 3 | 3 | 3 | 1.5 | 0.64 | 6 |

Fig. 13

| | SUBCARRIER 1 | SUBCARRIER 2 | SUBCARRIER 3 | SUBCARRIER 4 | SUBCARRIER 5 | TOTAL TRANSMISSION RATE |
|---|---|---|---|---|---|---|
| MOBILE STATION 1 | 1 | 1 | 0 | 0 | 1.5 | 3.5 |
| MOBILE STATION 2 | 0 | 0 | 0 | 0 | 0 | 0 |
| MOBILE STATION 3 | 0 | 0 | 3 | 3 | 0 | 6 |

MULTICARRIER COMMUNICATION BASE STATION DEVICE AND SUBCARRIER ALLOCATION METHOD

This application is the National Phase of PCT/JP2009/050647, filed Jan. 19, 2009, which is based upon and claims the benefit of priority from Japanese patent application No. 2008-30824, filed on Feb. 12, 2008, the disclosure of which is incorporated herein in its entirety by reference.

TECHNICAL FIELD

The present invention relates to a multicarrier communication base station device that multiplexes communications with a plurality of mobile stations by using a multicarrier, and its subcarrier allocation method.

BACKGROUND ART

In recent years, in the orthogonal frequency division multiplexing (hereinafter called "OFDM (Orthogonal Frequency Division Multiplexing)") mode, which is one of the multicarrier modulation modes, an orthogonal frequency division multiple access (hereinafter called "OFDMA (Orthogonal Frequency Division Multiple Access)") mode in which multiple accesses are implemented by assigning users to respective subcarriers, or respective subchannels that are obtained by grouping a plurality of subcarriers has been attracting attention. This OFDMA mode has been studied, for example, in IEEE802.16e, which is a standard of IEEE (Institute of Electrical and Electronics Engineers).

In the OFDM mode, information is transmitted by using N subcarriers having different frequencies. Note that in the multipath fading environments where transmission signals are received after passing through various paths, since the radio qualities of subcarriers are different from each other, a subcarrier(s) having a good radio quality is different from one mobile station to another. Therefore, it is necessary to allocate a subcarrier(s) that is determined to have as good radio quality as possible to each mobile station. Note that the better the radio quality of a subcarrier is, the higher transmission rate the communication can be performed at. Therefore, if each mobile station is allocated with a subcarrier having as good radio quality as possible, the communication can be performed with excellent efficiency as the entire system.

As a method in the related art, a method in which the dispersion value of the transmission rates of subcarriers is calculated for each mobile station and then subcarriers are allocated to a mobile station having the largest dispersion value until the requested transmission rate is satisfied has been proposed (e.g., see Patent document 1).

The subcarrier allocation method disclosed in Patent document 1 is explained hereinafter by using a specific example. In this example, the number of mobile stations is three, and the number of subcarriers is five. Further, in this example, the transmission rate is calculated based on the modulation mode and the encoding rate according to a table shown in FIG. 11.

Figure 11:
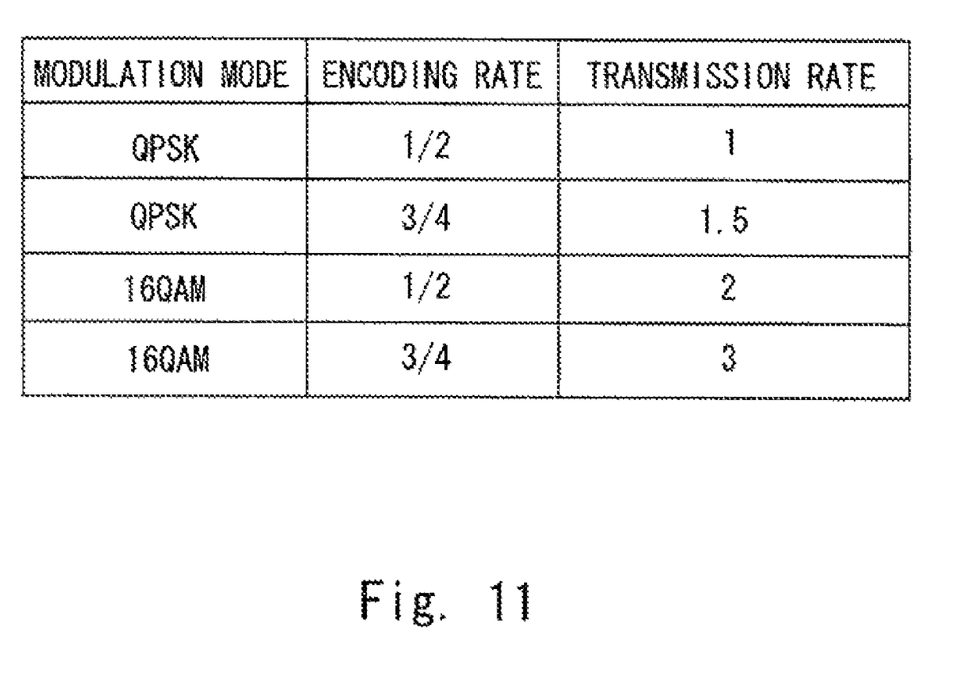
FIG. 11 shows an example of a table of transmission rates obtained from modulation modes and encoding rates.
Figure 12:
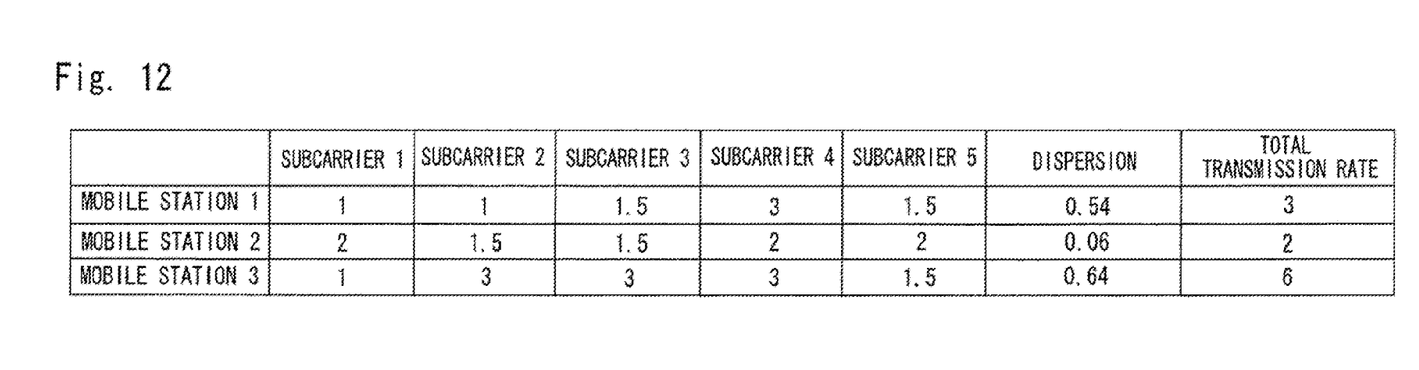
FIG. 12 is a table showing a specific example for explaining subcarrier allocation in a conventional mode.

Firstly, the transmission rates of respective subcarriers and their dispersion value are calculated according to the table shown in FIG. 11 for each mobile station. FIG. 12 is a table showing transmission rates for respective subcarriers, the dispersion value of the transmission rates, and a transmission rate requested from a mobile station for each of three mobile stations.

Firstly, among the three mobile stations, the allocation of a subcarrier(s) is started from the third mobile station having the largest dispassion value. Then, among the subcarriers of the third mobile station, the subcarriers 3 and 4 having the highest transmission rate are preferentially allocated. When the subcarriers 3 and 4 are allocated, the total transmission rate becomes 3+3=6 and the requested transmission rate, which is 6, is thereby satisfied. Therefore, the subcarrier allocation for the third mobile station is finished.

Figure 13:
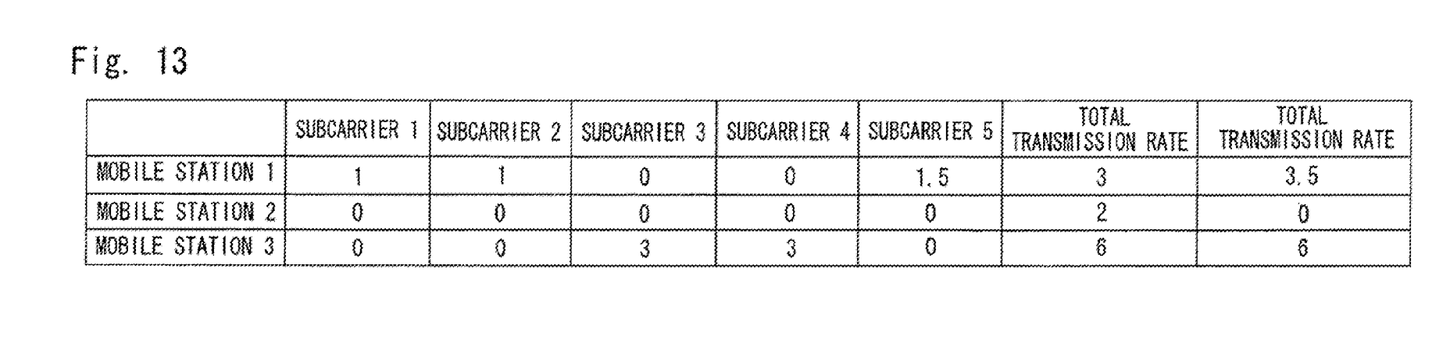
FIG. 13 is a table showing an allocation result in a specific example for explaining subcarrier allocation in a conventional mode.

Further, the subcarrier allocation is performed for the first mobile station having the next highest dispersion value after the third mobile station. Then, since the subcarriers 3 and 4, among all the subcarriers of the first mobile station, were already allocated to the third mobile station, the subcarrier allocation is performed from a subcarrier having the highest transmission rate among the remaining subcarriers 1, 2 and 5. In this example, when the subcarriers 1, 2 and 5 are allocated to the first mobile station, the total transmission rate becomes 1+1+1.5=3.5 and thereby satisfying the requested transmission rate of the first mobile station, which is 3. Therefore, the subcarrier allocation for the first mobile station is finished. With this allocation, all the subcarriers 1 to 5 have been allocated, and therefore the allocation is finished. FIG. 13 is a table showing the allocation result.

[Patent Document 1]
Japanese Unexamined Patent Application Publication No. 2005-102225

DISCLOSURE OF INVENTION

Technical Problem

A first problem in the above-described related art is that the mobile station to which the subcarrier is allocated is selected based only on the dispersion value of the transmission rates of the subcarriers in each mobile station. Therefore, the above-described related art does not take how the transmission rates are dispersed into consideration, and therefore the subcarrier allocation might not be performed with efficiency.

The reason for this is explained hereinafter with reference to the drawings.

In FIG. 12, in the third mobile station, while the average transmission rate of all the subcarriers is high, the transmission rate of the first subcarrier is low. Therefore, the dispersion value is large. Meanwhile, in the first mobile station, while the average transmission rate is low, the transmission rate of the fourth subcarrier is high. Therefore, the dispersion value is large.

For example, by allocating a subcarrier(s) having a large transmission rate to a mobile station having a low average transmission rate and a large dispersion value as in the case of the fourth subcarrier of the first mobile station, more efficient communication can be performed as the entire system. However, in the related-art method, the allocation is started from the third mobile station having a larger dispersion value than that of the first mobile station even though the transmission rates of most of the subcarriers are high in the third mobile station. Therefore, the subcarriers 3 and 4 are allocated to the third mobile station. Consequently, the first mobile station cannot be allocated with the fourth subcarrier having a high transmission rate. As a result, the allocation is performed on the first mobile station with subcarriers other than the subcarriers 3 and 4, which have a low transmission rate of 1.5 or lower, thus deteriorating the throughput as the entire system.

A second problem is that the priority of a mobile station for which the dispersion value of the transmission rates of subcarriers is small becomes lower, and therefore there is a possibility that no subcarrier can be allocated. As a result, the impartiality cannot be maintained.

Since the allocation of subcarriers having higher transmission rates is performed from a mobile station having a larger dispersion value, all the subcarriers could be allocated before the allocation to mobile stations having lower dispersion values, thus leaving no available subcarriers for the allocation. As a result, the problem like this occurs.

The present invention has been made to solve these problems, and an object thereof is to provide a multicarrier communication base station device and a carrier allocation method capable of implementing subcarrier allocation that can improve the throughput as the entire system and capable of providing better impartiality for subcarrier allocation to mobile stations.

Technical Solution

A multicarrier communication base station device in accordance with a first aspect of the present invention is a frequency division multiple access type multicarrier communication base station device that multiplexes a plurality of mobile stations on a frequency-time axis by using a plurality of subcarriers, including: a transmission rate information administration unit that administers transmission rate information of each subcarrier of each mobile station; and a subcarrier allocation unit that allocates a subcarrier based on transmission rate information, wherein the subcarrier allocation unit includes: selection unit that selects a subcarrier to be allocated based on transmission rate information in each mobile station; evaluation value calculation unit that calculates a reference value of a transmission rate with regard to a subcarrier to be allocated based on transmission rate information in each mobile station and then calculate an evaluation value that is obtained by evaluating a difference between the reference value and a transmission rate of a subcarrier excluded from allocation; and priority determination unit that determines a priority of a mobile station to be assigned to each subcarrier based on an evaluation value calculated by the evaluation value calculation unit.

A subcarrier allocation method in accordance with a second aspect of the present invention is a subcarrier allocation method in a frequency division multiple access mode in which a plurality of mobile stations are multiplexed on a frequency-time axis by using a plurality of subcarriers, the subcarrier allocation method including: selecting a subcarrier to be allocated based on transmission rate information in each mobile station; calculating a reference value of a transmission rate with regard to a subcarrier to be allocated based on transmission rate information in each mobile station and then calculating a value that is obtained by evaluating a difference between the reference value and a transmission rate of a subcarrier excluded from allocation; and determining a priority of a mobile station to be assigned to each subcarrier based on an evaluation value.

Advantageous Effects

The present invention can provide a multicarrier communication base station device and a carrier allocation method capable of implementing subcarrier allocation that can improve the throughput as the entire system and capable of providing better impartiality for subcarrier allocation to mobile stations.

EXPLANATION OF REFERENCE

1 MULTICARRIER COMMUNICATION BASE STATION DEVICE
2 MOBILE STATION
11 SUBCARRIER ALLOCATION UNIT
12 RADIO FRAME GENERATION UNIT
13 RADIO UNIT
14 ANTENNA
15 TRANSMISSION RATE INFORMATION ADMINISTRATION UNIT

BEST MODE FOR CARRYING OUT THE INVENTION

Figure 1:
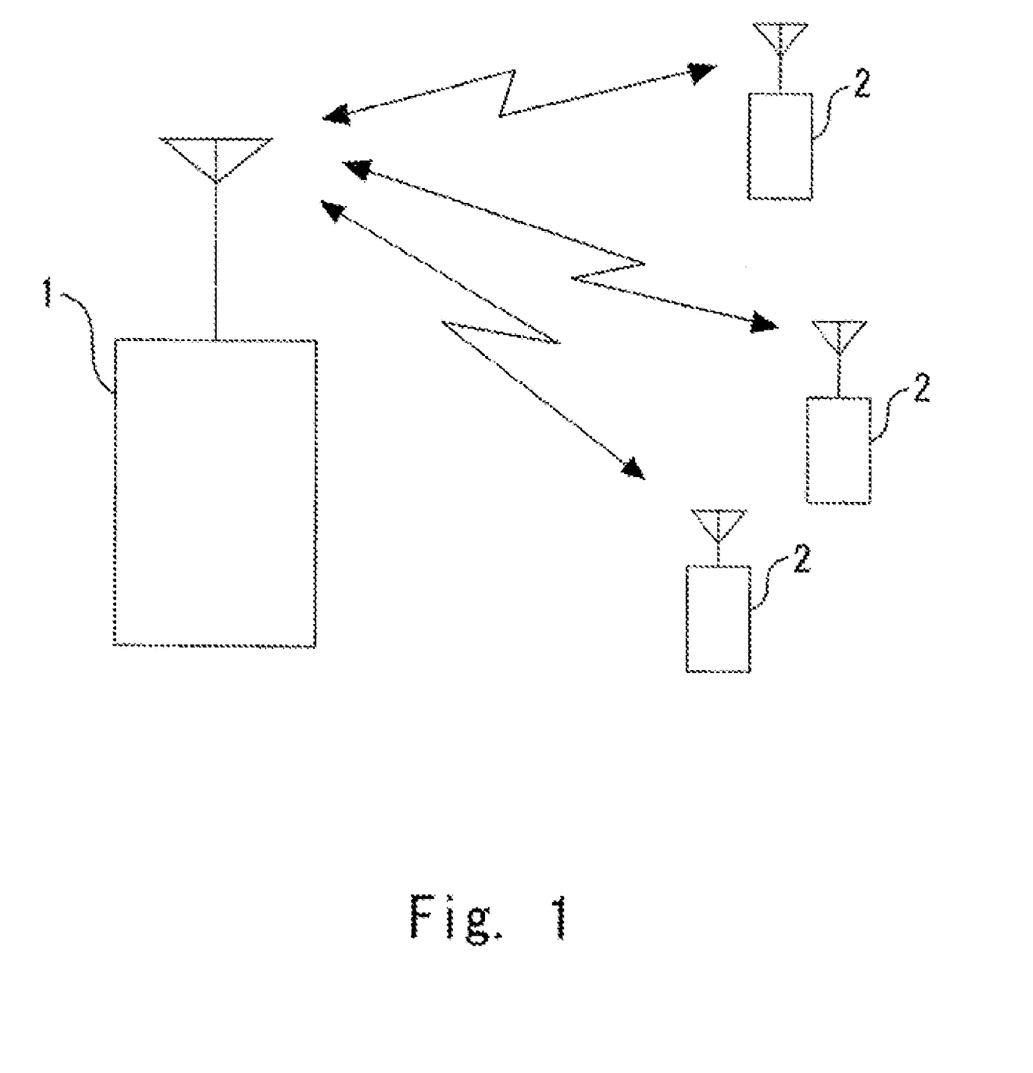
FIG. 1 is a block diagram showing a configuration of a radio communication system as an exemplary embodiment of the present invention.

FIG. 1 is a block diagram showing a configuration of a radio communication system in accordance with an exemplary embodiment of the present invention. As shown in FIG. 1, the radio communication system includes a plurality of mobile stations 2 and a multicarrier communication base station device 1 that performs radio data transmission/reception with the plurality of mobile stations 2.

Figure 2:
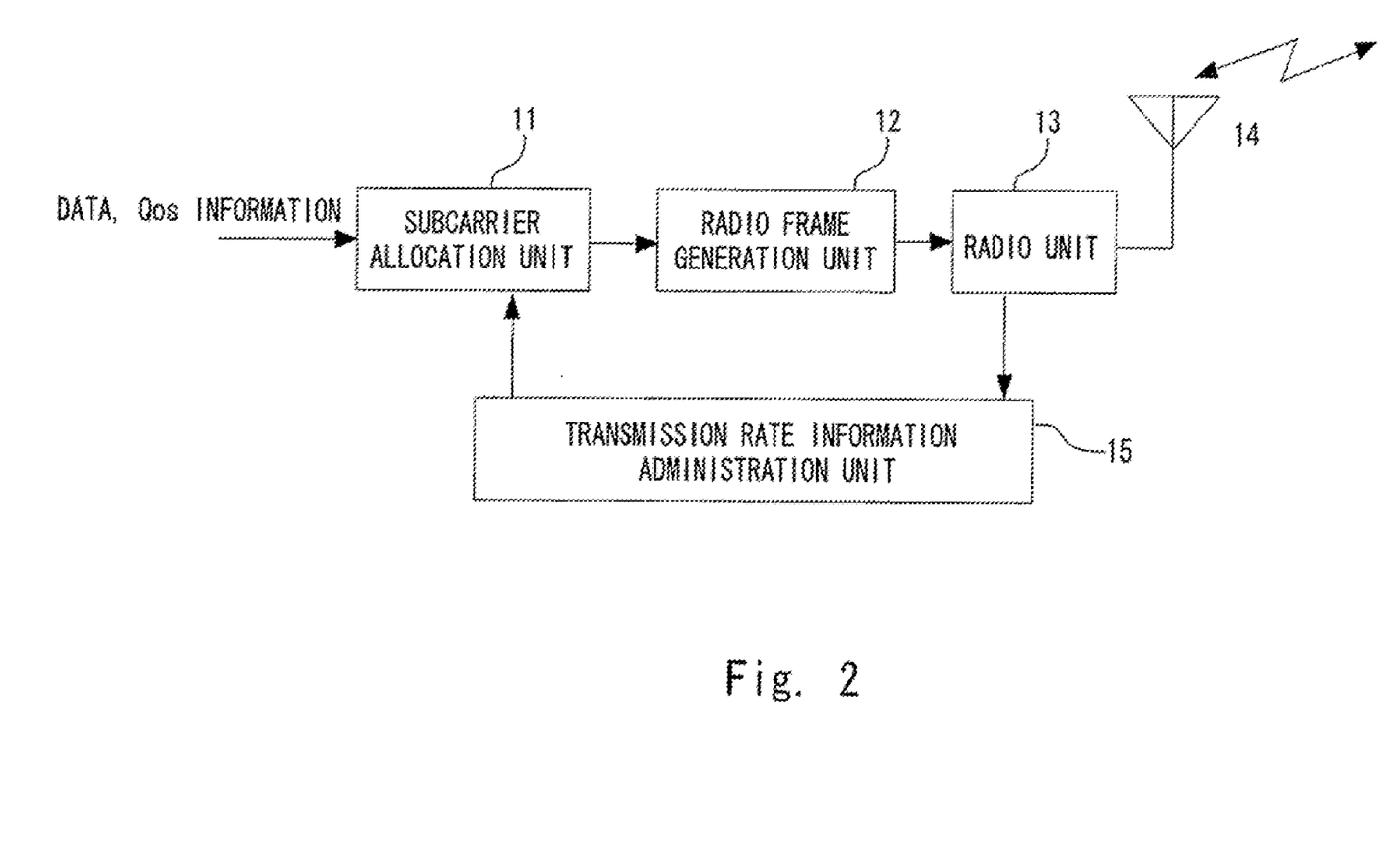
FIG. 2 is a block diagram showing a configuration of a multicarrier communication base station device in accordance with the present invention.

FIG. 2 is a block diagram showing a configuration of a multicarrier communication base station device in accordance with an exemplary embodiment of the present invention. The multicarrier communication base station device 1 includes a subcarrier allocation unit 11, a radio frame generation unit 12, a radio unit 13, an antenna 14, and a transmission rate information administration unit 15.

Transmission data and its QoS information, which is the quality information of the transmission data, are input to the subcarrier allocation unit 11. Further, transmission rate information which each subcarrier of each mobile station output from the transmission rate information administration unit 15 can transmit is also input to the subcarrier allocation unit 11. Note that transmission data to be input to the subcarrier allocation unit 11 may be data for which packet scheduling is made in advance. The subcarrier allocation unit 11 determines and outputs data that is assigned to the subcarrier based on transmission data, QoS information, and transmission rate information.

Data to be assigned to each subcarrier output from the subcarrier allocation unit 11 is input to the radio frame generation unit 12. Then, the radio frame generation unit 12 generates a radio frame and outputs the generated radio frame to the radio unit 13. At this point, if the size of the input data is smaller than the size of the radio frame, padding is performed to generate a radio frame.

The radio unit 13 performs modulation processing on the radio frame input from the radio frame generation unit 12, and outputs the modulated radio frame to the antenna 14. The modulated radio frame is input to the antenna 14. Then, the antenna 14 transmits the modulated radio frame to the mobile station 2.

The multicarrier communication base station device 1 receives a radio frame transmitted from each mobile station 2 through the antenna 14, and performs demodulation processing in the radio unit 13. In the demodulation processing step, the radio unit 13 acquires information indicating the reception state or transmission rate information notified from the mobile station from the radio frame, and outputs the acquired information to the transmission rate information administration unit 15.

Note that when the transmission rate that is notified as information from the mobile station 2 is used, the transmission rate does not need to be notified from the mobile station 2 to the multicarrier communication base station device 1 for all the subcarriers. Instead, only a subcarrier(s) having a high transmission rate may be notified.

The transmission rate information administration unit 15 administers transmission rates on a subcarrier-by-subcarrier basis for each mobile station based on each information input from the radio unit 13. For example, in the case of frequency division duplex (hereinafter called "FDD (Frequency Division Duplex)"), the uplink and the downlink different frequency bands are used for. That is, communication channels are different between the transmission and the reception. Therefore, the transmission rate of the downlink may be determined by using transmission rate information that is notified as information from the mobile station through the uplink. Further, in the case of time division duplex (hereinafter called "TDD (Time Division Duplex)"), the same frequency band is used for the uplink and downlink. That is, the same communication channel is used in both the transmission and the reception. Therefore, the transmission rate of the downlink may be calculated based on the reception state obtained from a radio signal on the uplink. Note that the transmission rate may be calculated from applied modulation mode and the encoding rate. Further, the transmission rate of a subcarrier having a significantly low radio quality may be calculated as zero. Alternatively, it may be dealt with as a subcarrier that is already allocated so that no allocation is performed.

Figure 3A:
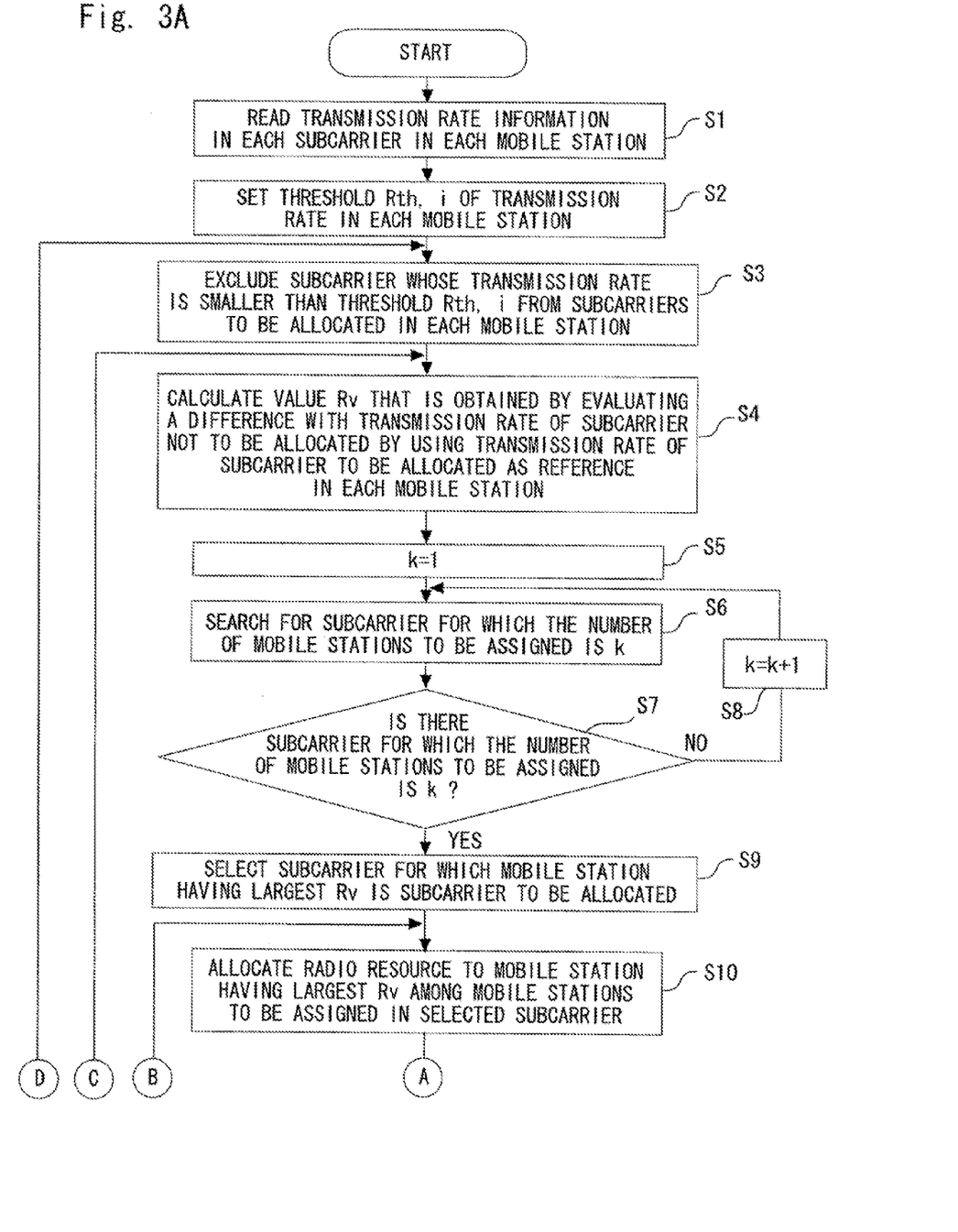
FIG. 3A is a flowchart showing processing steps of a subcarrier allocation unit 11 in accordance with an exemplary embodiment of the present invention.
Figure 3B:
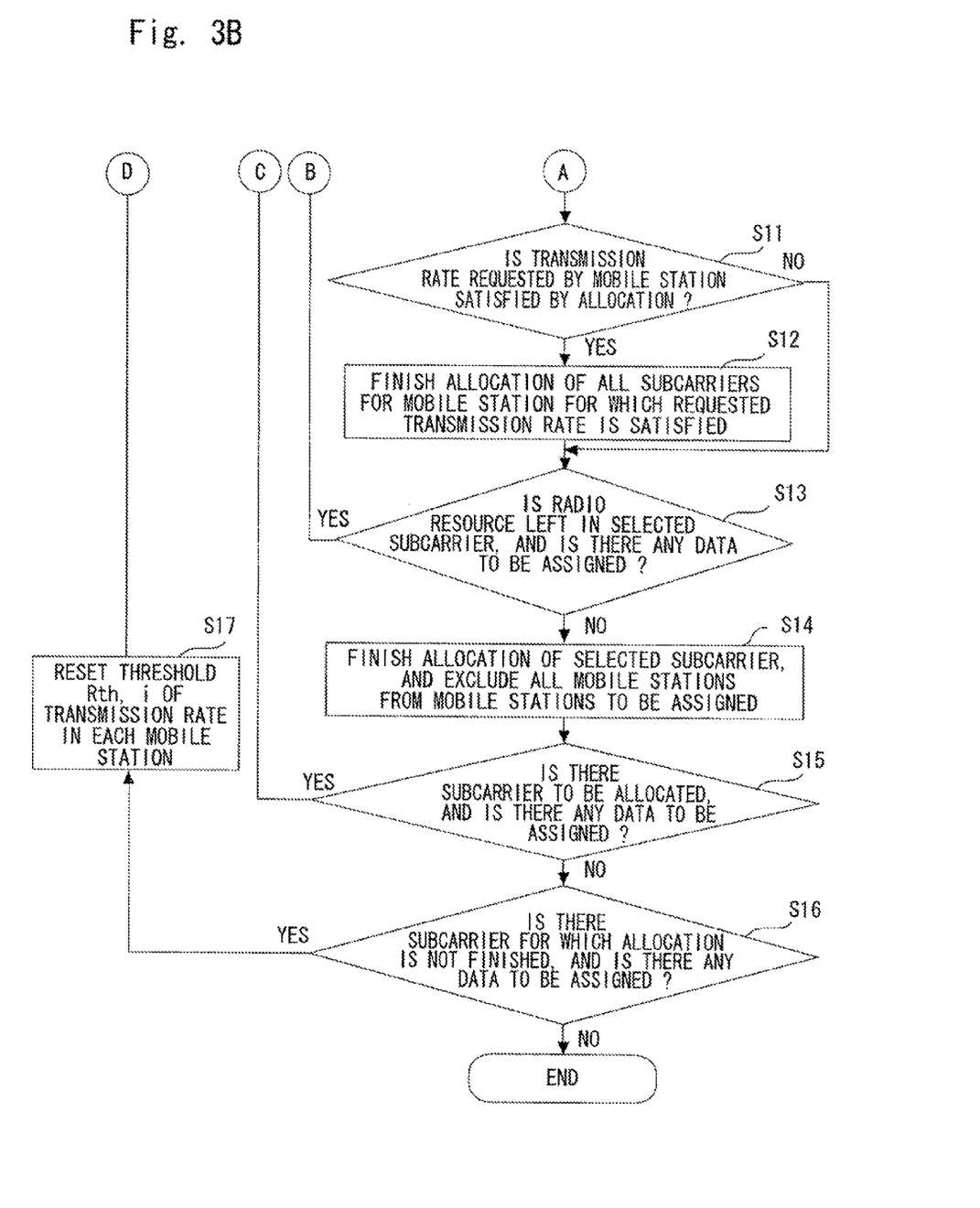
FIG. 3B is a flowchart showing processing steps of a subcarrier allocation unit 11 in accordance with an exemplary embodiment of the present invention.

Next, the processing of the subcarrier allocation unit 11 shown in FIG. 2 is explained by using a flowchart shown in FIGS. 3A and 3B with reference to specific examples shown in FIGS. 4 to 10.

Figure 4:
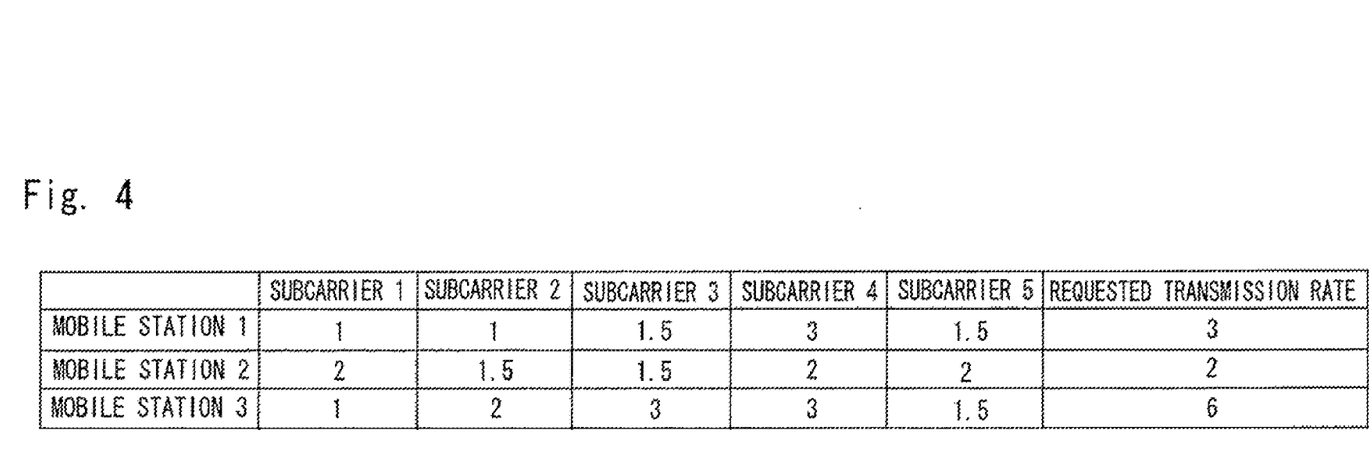
FIG. 4 is a table showing a specific example for explaining subcarrier allocation in accordance with the present invention.

Firstly, in a step S1, transmission rate information of each subcarrier and requested transmission rate in each mobile station are obtained from data and/or QoS information. Note that FIG. 4 shows transmission rate information of each subcarrier and a requested transmission rate for each mobile station in a specific example. In this example, the number of mobile stations is three, and the number of subcarriers is five. In this example, an assumption that one symbol is to be assigned to one subcarrier is made for simplifying the explanation.

Next, in a step S2, letting i stand for an index of a mobile station, a threshold Rth, i of a transmission rate in each mobile station is set for every mobile station. Note that examples of the threshold setting method include a method in which the maximum transmission rate at which transmission is possible, an average transmission rate, or the like is calculated from transmission rate information of each subcarrier of each mobile station and set as a threshold.

Figure 5:
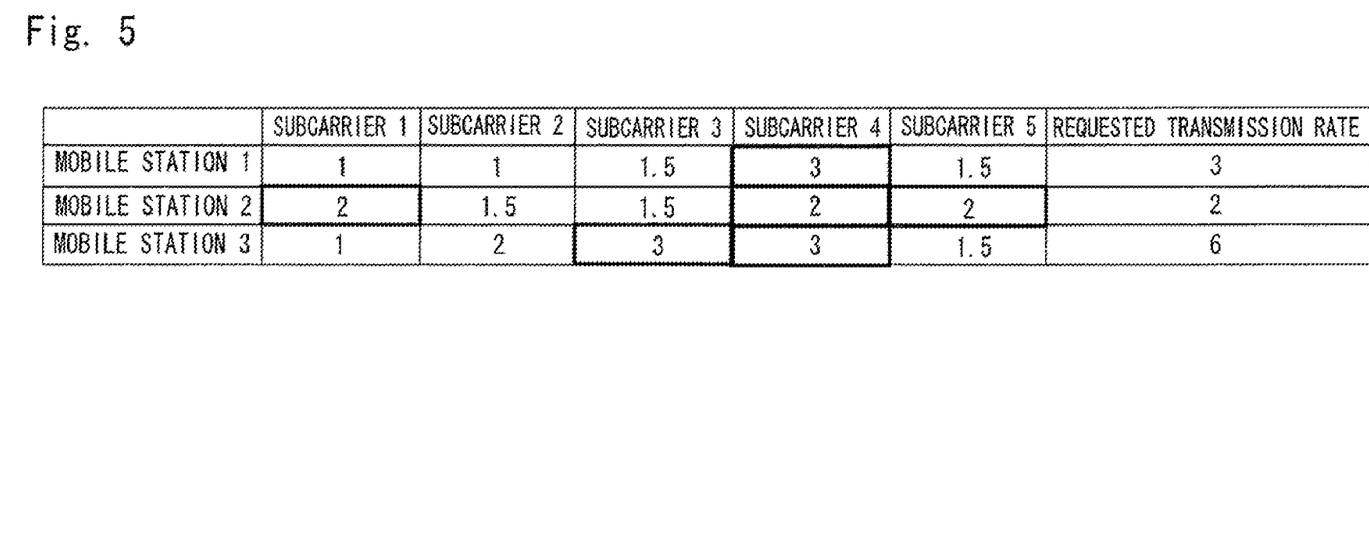
FIG. 5 is a table showing a specific example for explaining subcarrier allocation in accordance with the present invention.

In a step S3, subcarriers whose transmission rate is smaller than the threshold Rth, i are excluded from a target of the data assignment in each mobile station. In this way, by limiting the subcarriers to be allocated targets in each mobile station, it is possible to prevent too much priority from being given to subcarrier allocation to a certain mobile station(s). FIG. 5 shows an example where the maximum transmission rate at which transmission possible is used as a threshold. Among the subcarriers shown in FIG. 5, the subcarriers within the thick-line boxes are defined as the allocated targets and the other subcarriers are excluded from the allocation.

In a step S4, by using the average value of the transmission rates of the subcarriers to be allocated as a reference value in each mobile station, a value Rv, i that is obtained by evaluating a difference between the reference value and the transmission rate of the subcarriers excluded from the allocation is calculated. For example, assuming that the average transmission rate of the subcarriers to be allocated is Rave, i; the number of the subcarriers excluded from the allocation is n: the index of the subcarriers excluded from the allocation is p; the transmission rate of the subcarriers excluded from the allocation is Ro, p; and the parameter that is determined in advance in the subcarrier allocation unit is Rv0, Rv, i in a mobile station i may be calculated based on the following equation.

$$Rv, i = \frac{1}{n}\sum_{p=1}^{n}(Rave, i - Ro, p) \quad \text{where } n > 0 \quad \text{[Equation 1]}$$

$$Rv, i = Rv_0 \quad \text{where } n = 0$$

Figure 6:
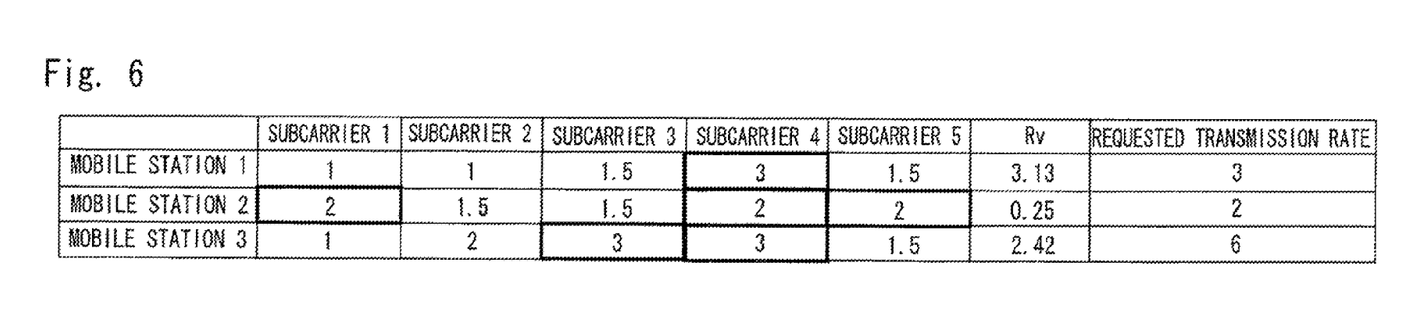
FIG. 6 is a table showing a specific example for explaining subcarrier allocation in accordance with the present invention.

By using the equation like this and thereby evaluating a difference in transmission rate between subcarriers to be allocated and subcarriers excluded from the assignment in this round, it is possible to grasp the priority of the mobile station in the current allocation. Note that since the allocation of subcarriers that satisfy the requested transmission rate and subcarriers which were already allocated and in which no radio resources are left is already finished, they are not included in the subcarriers excluded from the allocation. Further, the maximum possible value may be set as the value of Rv0, or 0 may be set as the value of Rv0. FIG. 6 shows calculation results of the evaluation value Rv, i.

In a step S5, the number k of mobile stations which are assigned to one subcarrier is initialized to one. Then, in a step S6, a subcarrier which assigns k-mobile stations is searched for.

Next, in a step S7, it is determined whether or not there is any subcarrier for which the number of mobile stations to be assigned is k. If there is no subcarrier for which the number of mobile stations to be assigned is k, the process proceeds to a step S8 in which the value of k is incremented by one and then the process returns to the step S7.

Further, in a step S9, a subcarrier subject to allocation to the mobile station having the largest Rv is selected. If there are two or more subcarriers that are subject to allocation to mobile stations having the same Rv, only one subcarrier is selected, for example, by selecting a subcarrier having a smaller index that is determined in advance for each subcarrier. Note that in the example shown in FIG. 6, the subcarrier 3 is selected first.

In a step S10, the allocation of the subcarrier selected in the step 9 is started. Among the mobile stations to be assigned to the selected subcarrier, the radio resource is allocated to a mobile station having the largest evaluation value Rv, and the mobile station that was assigned to the selected subcarrier is excluded from the allocation. At this point, the value of the requested transmission rate is subtracted by the amount of the allocated transmission rate.

Further, when no radio resources of subcarriers for which allocation was performed are left by performing allocation, the assignment of all the mobile stations to the allocated subcarriers is finished. The term "radio resource" means a set of a subcarrier to be allocated and a symbol. When subcarrier allocation is performed by using a number of symbols in the time direction, one subcarrier can be allocated to a plurality of mobile stations because there are a plurality of symbols in one subcarrier.

Figure 7:
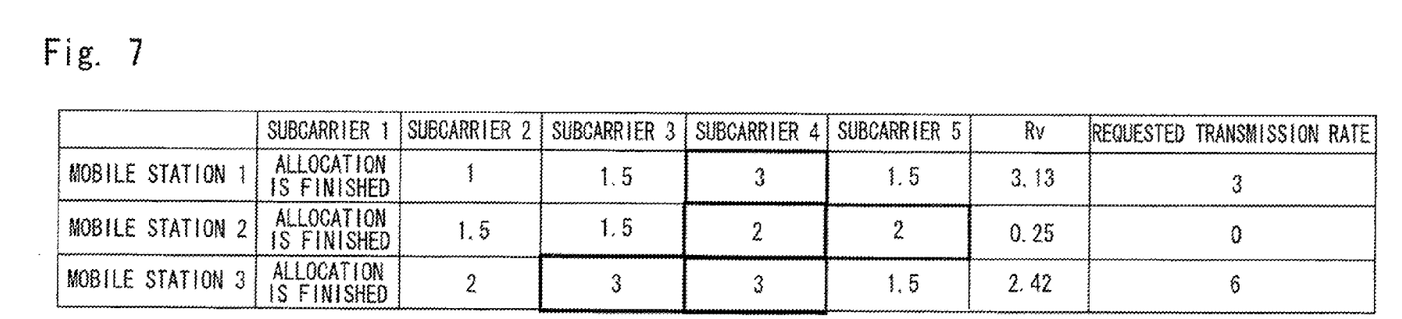
FIG. 7 is a table showing a specific example for explaining subcarrier allocation in accordance with the present invention.

In the example shown in FIG. 6, since only one symbol is to be assigned to one subcarrier, the assignment of all the mobile stations is finished for the subcarrier 3 after the allocation to the mobile station 2 is performed. FIG. 7 shows a result obtained when the mobile station 3 is assigned to the subcarrier 3 and therefore the assignment of all the mobile stations for the subcarrier 3 is finished.

Next, in a step S11, it is determined whether or not the transmission rate requested by the mobile station is satisfied by the allocation of the subcarrier. If the transmission rate requested by the mobile station is satisfied, the process proceeds to a step S12 and the allocation of all the subcarriers of the mobile station which satisfy the requested transmission rate is finished. In the example shown in FIG. 7, since the requested transmission rate is not satisfied for the mobile station 3, the process to finish the allocation of all the subcarriers for the mobile station 3 is not carried out.

In a step S13, it is determined whether or not any radio resource is left in the selected subcarrier and there is any data to be assigned.

In a step S14, the allocation of the selected subcarrier is finished, and all the mobile stations are excluded from the assignment in the selected subcarriers. In the example shown in FIG. 7, since all the mobile stations were already excluded from the assignment in the subcarrier 3, all the mobile stations remain excluded from the assignment.

Figure 8:
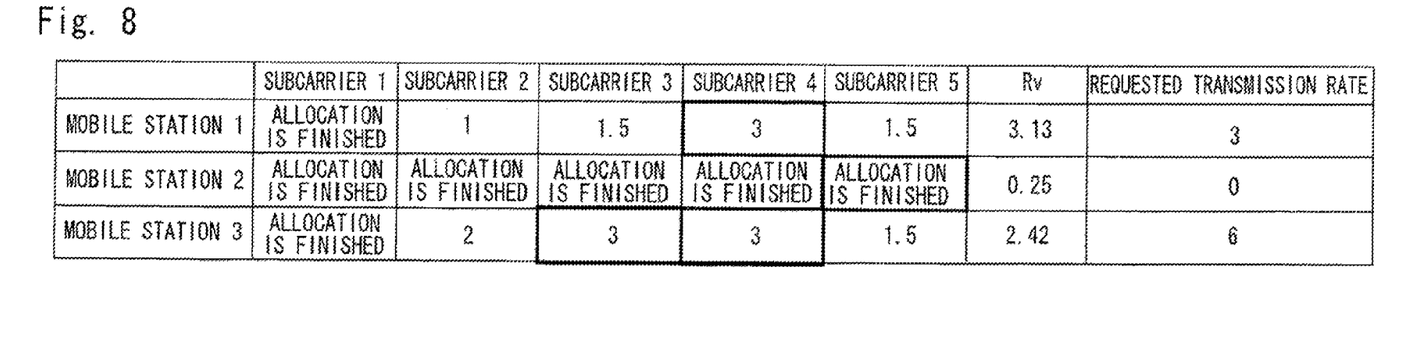
FIG. 8 is a table showing a specific example for explaining subcarrier allocation in accordance with the present invention.
Figure 9:
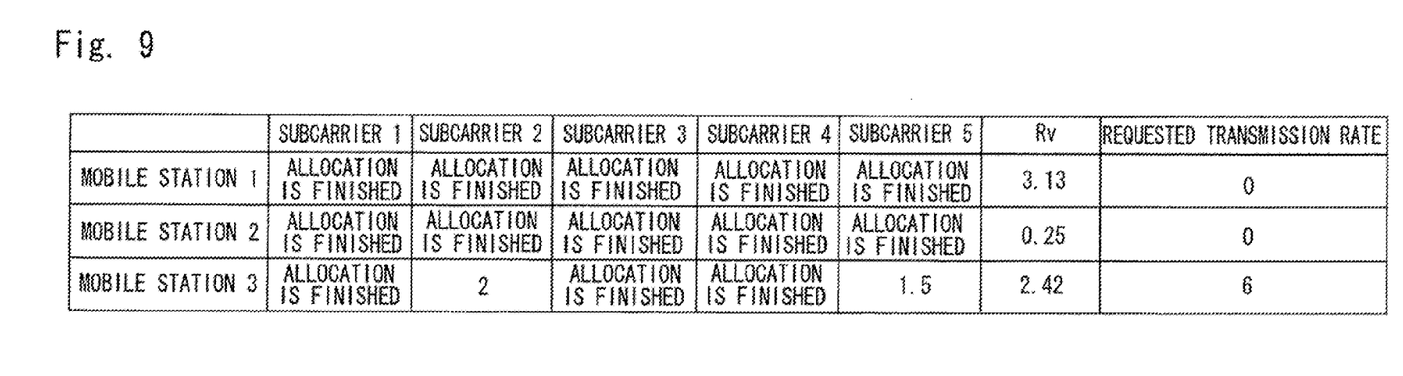
FIG. 9 is a table showing a specific example for explaining subcarrier allocation in accordance with the present invention.

In a step S15, it is determined whether or not there is any subcarrier to be allocated and there is any data to be assigned. In the example shown in FIG. 7, since the subcarriers 1, 4 and 5 are to be allocated, the process returns to the step S4. In the step S4, Rv is updated. Then, in the step S7 the subcarriers 1 and 5 for each of which the number of mobile stations to be assigned is one, become the subcarriers to be allocated. In the subcarriers 1 and 5, since only the mobile station 2 is the mobile station to be assigned, the mobile station having the same Rv is the mobile station to be assigned. This example adopts a scheme in which when there are two or more subcarriers to which a mobile station having the same Rv is to be assigned, a subcarrier having a smaller subcarrier index is allocated first. Therefore, the mobile station 2 is first assigned to the subcarrier 1. As such, since no radio source remains in the subcarrier 1, the assignment of all the mobile stations for the subcarrier 1 is finished. Furthermore, since the requested transmission rate is satisfied for the mobile station 2, the allocation of all the subcarriers for the mobile station 2 is finished. Therefore, the result shown in FIG. 8 is obtained. Thereafter, the process returns to the step S4 again and the mobile station 1 is assigned to the subcarrier 4. Since no radio source remains in the subcarrier 4, the assignment of all the mobile stations for the subcarrier 4 is finished. In addition, since the requested transmission rate is satisfied for the mobile station 1, the allocation of all the subcarriers for the mobile station 1 is finished. Therefore, the result shown in FIG. 9 is obtained and the process proceeds to a step S16.

In a step S16, it is determined whether or not there is any subcarrier for which the assignment is not finished and there is any data to be assigned. Then, if there is not any subcarrier or any data, the process is finished. In the example shown in FIG. 9, since there is data to be assigned in the third mobile station, the process proceeds to the step S17.

Figure 10:
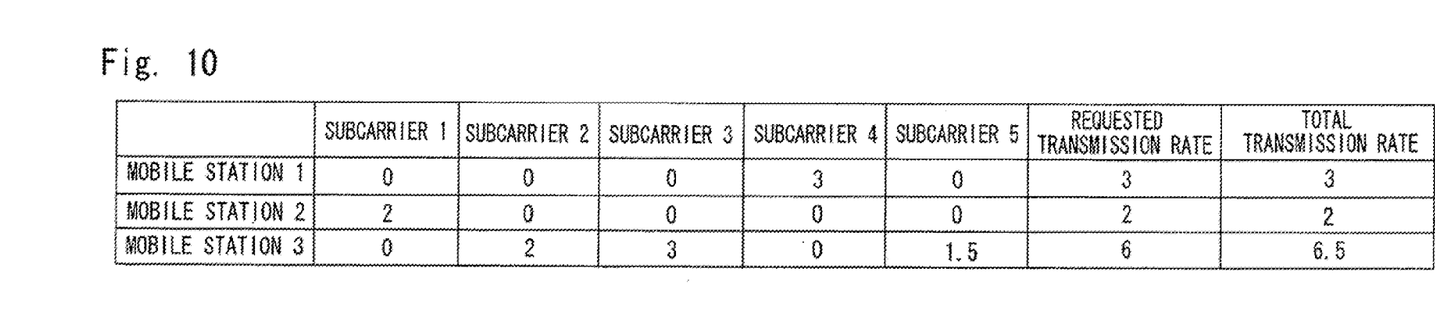
FIG. 10 is a table showing an allocation result in a specific example for explaining subcarrier allocation in accordance with the present invention.

In the step S17, the threshold Rth, i of the transmission rate is reset in each mobile station, and the process returns to the step S3. Note that as an example of the threshold setting method, the maximum transmission rate which the subcarrier can transmit, an average transmission rate, or the like is calculated from transmission rate information of each subcarrier of each mobile station and set as a threshold. In the step S17, by repeatedly performing the resetting of the threshold and the allocation, the third mobile station is assigned to the second subcarrier and the third mobile station is also assigned to the fifth subcarrier in the example of FIG. 9. As a result, the transmission rate is satisfied for all the mobile stations 1, 2 and 3 and the process is finished. FIG. 10 shows the final allocation result. Note that in FIG. 10, the requested transmission rates indicate the transmission rates requested from the mobile stations before performing the subtraction.

Note also that although the calculation of the transmission rate and the allocation are performed by defining a subcarrier as the minimum unit in the above explanation, each operation may be performed by using a subchannel that is obtained by grouping a plurality of subcarriers as the minimum unit. Further, although only the requested transmission rate is taken into consideration in each mobile station, two or more transmission rates such as a pair of the minimum transmission rate and the maximum transmission rate may be provided. In such a case, for example, the minimum transmission rate is first assigned as the requested transmission rate. Then after the assignment, if any radio resource is left, the maximum transmission rate is assigned as the requested transmission rate. In this way, a plurality of requested transmission rates may be set and repeatedly assigned.

As described above, in accordance with the present invention, by selecting only subcarriers having high transmission rates as the subcarriers to be allocated in each mobile station, the assignment is performed while limiting the number of subcarriers to be allocated. Then, the subcarriers to be allocated are re-defined and assignment is performed. By repeating these processes, the impartiality among each mobile station can be improved. Further, by using the transmission rate of the subcarriers to be allocated as a reference, a high priority is given to the subcarrier allocation for a mobile station having a high value Rv that is obtained by evaluating a difference with the transmission rate of the subcarrier excluded from the allocation. In this way, the allocation with a subcarrier having a higher transmission rate becomes possible in each mobile station, thus enabling the throughput as the entire system to be improved.

A first advantage is that the allocation with a subcarrier having a high transmission rate becomes possible in each mobile station, and therefore efficient communication can be realized as the entire system. This is because the allocation is performed in the following manner. Firstly, a reference value of the transmission rate of the subcarriers to be allocated is set in each mobile station based on the transmission rate information. Then, a value that is obtained by evaluating a difference between the reference value and the transmission rate of the subcarriers excluded from the allocation is calculated. After that, by determining the priority of the mobile station to be assigned based on the evaluated value, the assignment in which variations among subcarriers from the reference value are taken into consideration can be performed, thus enabling efficient allocation to be realized.

A second advantage is that the impartiality among mobile stations can be improved for the subcarrier allocation. This is because the allocation is repeated while limiting the subcarriers to be allocated. In this way, it is possible to prevent a lot of subcarriers from being allocated to a mobile station having a high priority at one time, and thereby to improve the impartiality of the subcarrier allocation for each mobile station.

Although the present invention is explained with reference to certain exemplary embodiments so far, the present invention is not limited to the above-described exemplary embodiments. Various modifications that can be easily understood by those skilled in the art can be made to the configuration and details of the present invention without departing from the scope of the present invention.

INDUSTRIAL APPLICABILITY

The present invention can be applied to multicarrier communication base station devices that multiplex communications with a plurality of mobile stations by using a multicarrier, and their subcarrier allocation methods.

The invention claimed is:

1. A frequency division multiple access type multicarrier communication base station device that multiplexes a plurality of mobile stations on a frequency-time axis by using a plurality of subcarriers, comprising:
a transmission rate information administration unit that administers transmission rate information of each subcarrier for each mobile station; and
a subcarrier allocation unit that allocates each subcarrier based on the transmission rate information,
wherein at least one of the transmission rate information administration unit and the subcarrier allocation unit is implemented at least in hardware,
wherein the subcarrier allocation unit comprises:
selection unit that selects one or a plurality of candidate subcarriers to be allocated based on the transmission rate information of each mobile station;
evaluation value calculation unit that calculates, for each mobile station, a reference value for transmission rates of the respective mobile station on the one or the plurality of candidate subcarriers and then calculates, for each mobile station, an evaluation value that is obtained by evaluating a difference between the respective reference value and one or a plurality of transmission rates of one or a plurality of subcarriers excluded from allocation; and
priority determination unit that determines a priority of the respective mobile station to be allocated each candidate subcarrier based on the respective evaluation value calculated by the evaluation value calculation unit.

2. The multicarrier communication base station according to claim 1, wherein the selection unit calculates a threshold for each mobile station, from the transmission rate information of each subcarrier of the respective mobile station, and for each mobile station, selects as the one or the plurality of candidate subcarriers those subcarriers on which the transmission rate of the respective mobile station is equal to or greater than the respective threshold.

3. The multicarrier communication base station according to claim 2, wherein the respective threshold is a maximum transmission rate at which transmission is possible for the respective mobile station on any subcarrier.

4. The multicarrier communication base station according to claim 2, wherein the respective threshold is an average value of transmission rates on all the subcarriers of the respective mobile station.

5. The multicarrier communication base station according to claim 1, wherein, for each mobile station, the respective reference value is an average of the transmission rates on the one or the plurality of candidate subcarriers of the respective mobile station.

6. The multicarrier communication base station according to claim 1, wherein assuming that an average transmission rate on the one or the plurality of candidate subcarriers of a mobile station i is Rave, i; a number of the one or the plurality of subcarriers excluded from the allocation is n; an index of the one or the plurality of subcarriers excluded from allocation is p; a transmission rate on the one or the plurality of subcarriers excluded from the allocation is Ro, p; and a parameter that is determined in advance in the subcarrier allocation unit is Rv0, the evaluation value calculated by the evaluation value calculation unit is calculated based on the following equation:

$$Rv, i = \frac{1}{n}\sum_{p=1}^{n}(Rave, i - Ro, p) \quad \text{where } n > 0 \qquad \text{[Equation 1]}$$

$$Rv, i = Rv_0 \qquad \text{where } n = 0.$$

7. The multicarrier communication base station according to claim 6, wherein the priority determination unit gives higher priorities to mobile stations having larger evaluation values.

8. The multicarrier communication base station according to claim 1, wherein after the selection unit selects and allocates a candidate subcarrier, the selection unit again selects a candidate subcarrier.

9. A subcarrier allocation method in a frequency division multiple access system in which a plurality of mobile stations are multiplexed on a frequency-time axis by using a plurality of subcarriers, the subcarrier allocation method comprising:
selecting one or a plurality of candidate subcarriers to be allocated based on transmission rate information of each mobile station;
calculating for each mobile station a reference value for transmission rates on the one or the plurality of candidate subcarriers of the respective mobile station and then calculating, for each mobile station, an evaluation value that is obtained by evaluating a difference between the respective reference value and one or a plurality of transmission rates on one or a plurality of subcarriers excluded from allocation; and determining a priority of the respective mobile station to be allocated each candidate subcarrier based on the respective evaluation value of the respective mobile station.

10. The subcarrier allocation method according to claim 9, wherein selecting the one or the plurality of candidate subcarriers comprises:

calculating a threshold for each mobile station from the respective transmission rate information of each subcarrier of the respective mobile station; and for each mobile station, selecting as the one or the plurality of candidate subcarriers the subcarriers on which the transmission rate of the respective mobile station is equal to or greater than the respective threshold.

11. The subcarrier allocation method according to claim 10, wherein the respective threshold is a maximum transmission rate at which transmission is possible for the respective mobile station on any subcarrier.

12. The subcarrier allocation method according to claim 10, wherein the respective threshold is an average value of the transmission rates on all subcarriers of the respective mobile station.

13. The subcarrier allocation method according to claim 9, wherein the respective reference value is an average of the transmission rates on the one or the plurality of candidate subcarriers of the respective mobile station.

14. The subcarrier allocation method according to claim 9, wherein assuming that an average transmission rate on the one or the plurality of candidate subcarriers of a mobile station i is Rave, i; a number of the one or the plurality of subcarriers excluded from the allocation is n; an index of the one or the plurality of subcarriers excluded from the allocation is p; a transmission rate on the one or the plurality of subcarriers excluded from the allocation is Ro, p; and a parameter that is determined in advance is Rv0, the evaluation value is calculated based on the following equation:

[Equation 2]
$$Rv, i = \frac{1}{n}\sum_{p=1}^{n}(Rave, i - Ro, p)^2 \quad \text{where } n > 0$$
$$Rv, i = Rv_0 \quad \text{where } n = 0.$$

15. The subcarrier allocation method according to claim 14, wherein higher priorities are given to mobile stations having larger evaluation values.

16. The subcarrier allocation method according to claim 9, wherein selecting the candidate subcarriers comprises after selecting and allocating a candidate subcarrier, again selecting a candidate subcarrier.

* * * * *